B. L. CAMPBELL.
COMPRESSION BRAKE.
APPLICATION FILED APR. 12, 1917.
1,247,930.
Patented Nov. 27, 1917.
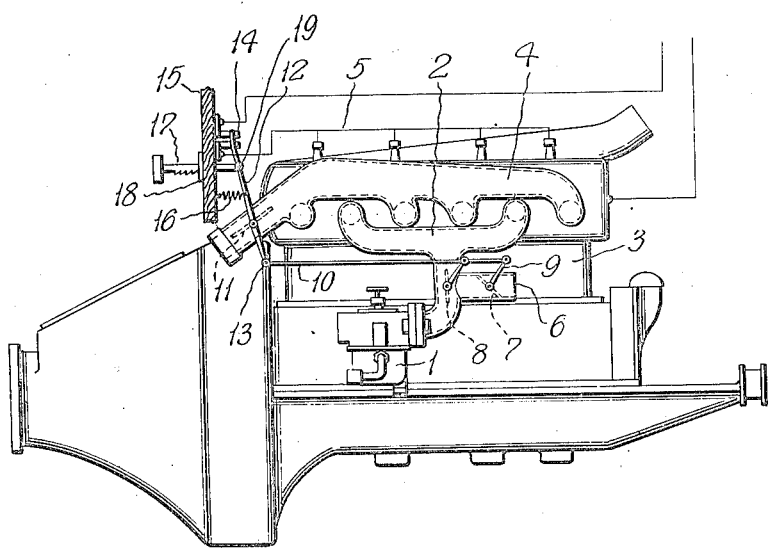
Witness
Karl H. Butler
Chas. W. Stauffiger
Inventor
Bert L. Campbell.
By
Attorneys

UNITED STATES PATENT OFFICE.

BERT L. CAMPBELL, OF DETROIT, MICHIGAN.

COMPRESSION-BRAKE.

1,247,930.  Specification of Letters Patent.  Patented Nov. 27, 1917.

Application filed April 12, 1917. Serial No. 161,424.

*To all whom it may concern:*

Be it known that I, BERT L. CAMPBELL, a citizen of the United States of America, residing at Detroit, in the county of Wayne and State of Michigan, have invented certain new and useful Improvements in Compression-Brakes, of which the following is a specification, reference being had therein to the accompanying drawings.

This invention relates to a compression brake for vehicles operated by an internal combustion engine or vehicles having air pumps operated from the axles thereof.

The primary object of my invention is the provision of positive and reliable means, in a manner as hereinafter set forth, in connection with an internal combustion engine of an automobile, so that with the clutch in or the engine operatively connected relative to the rear axle or wheels of an automobile, the compression strokes of the pistons in the internal combustion engine can be utilized, in connection with air for retarding or eventually stopping an automobile.

A further object of my invention is to provide an automobile brake of the above type that does not necessitate material changes of an automobile to incorporate the brake, besides the brake mechanism has been constructed with a view of reducing the cost of manufacture and at the same time retain those features by which simplicity and ease of control are secured. With such ends in view, my invention resides in matters to be hereinafter described and then claimed.

Reference will now be had to the drawing showing a side elevation of an internal combustion engine constructed to afford a brake in acordance with my invention.

The reference numeral 1 denotes a carbureter having the usual intake manifold 2 supplying the cylinders of the engine, generally designated 3, with fuel and the same cylinders have an exhaust through a manifold 4.

5 generally denotes a portion of an ignition system for the engine, and the elements thus far referred to are of a conventional form found in connection with many motor driven vehicles.

My invention resides in providing the intake manifold 2 with a branch 6 open to the atmosphere and in this branch, as well as the intake manifold 2, are located butterfly valves 7 and 8, the former adapted to close the branch 6 and the latter adapted to close the lower portion of the intake manifold 2 relative to the carbureter. The valves 7 and 8 have crank portions 9 articulated with a reach rod 10 and by reciprocating this reach rod, the branch 6 may be closed by the valve 7 and the carbureter placed in direct communication with the intake manifold, or the branch 6 may be opened in direct communication with the intake manifold 2 and the carbureter 1 cut off therefrom by the valve 8.

The exhaust manifold 4, adjacent the down pipe thereof is provided with a butterfly valve 11 having a long crank 12 with the lower end thereof connected to the reach rod 10, as at 13. The upper end of the crank 12 serves as a switch arm or blade with a knife switch 14 included in the ignition system 5, and said crank is connected to a dash 15 or suitable support by a coiled retractile spring 16. Extending through the dash or support 15 is a ratchet arm 17 adjustable relative to a plate 18 on the dash 15. The ratchet arm 17 is pivotally connected, as at 19, to the crank 12 and said ratchet arm may be manually adjusted either with the foot or hand.

Considering the operation of the brake, the valves 7, 8 and 11 are used in addition to the usual throttle valve of the carbureter and when coasting the clutch may be left in, the throttle of the carbureter closed and then the ratchet arm 17 manipulated to produce a braking action. When pressing inwardly on the ratchet arm 17, the ignition circuit to the spark plugs of the engine is broken and the valves 8 and 11 closed and the valve 7 opened. The intake manifold 2 is therefore in communication with the atmosphere through the branch 6 and at each downstroke of the engine piston air is drawn through the branch 6 into the engine cylinders. On the upstroke of the engine pistons some of the air will be forced into the exhaust manifold 4, but as this manifold is closed to the atmosphere by the manifold 11, the air will be compressed in the exhaust manifold 4 and before many strokes of the engine pistons, air is compressed therein. The compression is gradually built up and consequently there is a gradual retardation of the action of the pistons within the engine cylinders, this retardation being transmitted to the rear axle and the wheels of the automobile with the resulting brake action. The engine pistons may eventually be brought to a standstill in the cylinders, and the braking effect may be eased off by adjusting the ratchet arm 17 so as to partially open the valve 11, relieve pressure in the exhaust manifold 4, and partially close the valve 7. The manipulation of the ratchet arm 17 is easy compared to the treadle or pedal of an ordinary band brake mechanism, and by completely releasing the ratchet arm 17, the spring 16 will restore all of the valves to initial position, thereby establishing proper conditions for again using the engine as a power plant of the automobile.

One embodiment of my invention has been illustrated, but it is to be understood that the structural elements are susceptible to such variations and modifications as fall within the scope of the appended claims.

What I claim is:—

1. In a compression brake for vehicles, an internal combustion engine having cylinders and pistons operable in the engine cylinders, an exhaust manifold for the engine cylinders, an intake manifold for the engine cylinders adapted to communicate with the atmosphere, means including valves adapted to close said exhaust manifold and open said intake manifold to the atmosphere so that air is compressed in said engine cylinders to retard the action of the pistons therein.

2. In a compression brake for vehicles, an internal combustion engine having cylinders and pistons operable in the engine cylinders, an exhaust manifold for the engine cylinders, an intake manifold for the engine cylinders adapted to communicate with the atmosphere, valves for said manifold adapted to close said exhaust manifold and open said intake manifold to the atmosphere, so that air is compressed in said engine cylinders to retard the action of the pistons therein, and means adapted for moving said valves in synchronism.

3. In a compression brake for vehicles, an internal combustion engine having cylinders and pistons operable in the engine cylinders, an exhaust manifold for the engine cylinders, an intake manifold for the engine cylinders, a branch carried by the intake manifold adapted to place the engine cylinders in communication with the atmosphere, and articulated valves in said intake manifold, the branch thereof and said exhaust manifold adapted for adjustment in synchronism so that air may be admitted to the engine cylinders and the exhaust manifold and compressed therein to retard the action of the pistons in said engine cylinders.

4. In a compression brake for vehicles, an internal combustion engine having the cylinders and pistons operable in the engine cylinders, an exhaust manifold for the engine cylinders, an intake manifold for the engine cylinders, a branch carried by said intake manifold adapted to place said engine cylinders in communication with the atmosphere, a valve in the exhaust manifold, a valve in the intake manifold below the branch thereof, a valve in the branch of said intake manifold, and means articulating said valve, so that the valves of said manifold may be simultaneously closed and the valves of said branch opened, thus admitting air to the engine cylinders to be compressed therein to retard the movement of the pistons in the engine cylinders.

5. In a compression brake for vehicles, an internal combustion engine having cylinders and pistons operable in the engine cylinders, an exhaust manifold in the engine cylinders, an intake manifold for the engine cylinders, a carbureter in communication with the intake manifold, an ignition system for said engine, a branch carried by the intake manifold adapted to establish communication between the engine cylinders and the atmosphere, a valve in the exhaust manifold, a valve in said intake manifold between said carbureter and said branch, a valve in the branch of said intake manifold and means articulating all of said valves adapted to simultaneously render said ignition system inoperative, close the valves of said manifold and open the valves of said branch.

In testimony whereof I affix my signature in the presence of two witnesses.

BERT L. CAMPBELL.

Witnesses:
KARL H. BUTLER,
ANNA M. DORR.